Figure 2A:
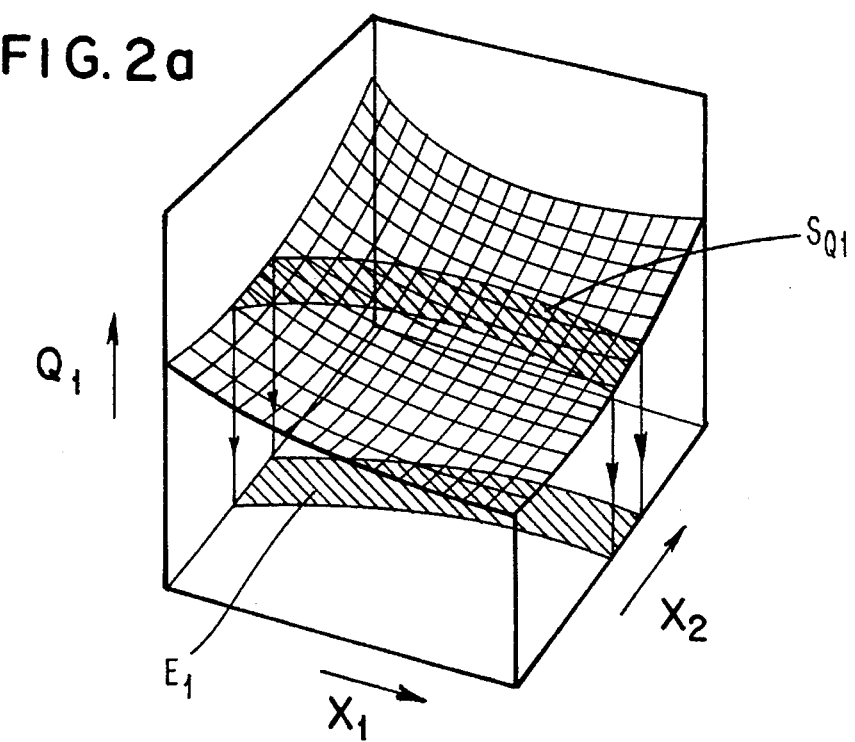

United States Patent [19]

Steinbichler

[11] Patent Number: 5,550,744
[45] Date of Patent: Aug. 27, 1996

[54] METHOD OF CONTROLLING A MACHINE FOR THE MANUFACTURE OF PRODUCTS, IN PARTICULAR FOR CONTROLLING AN INJECTION MOLDING MACHINE

[75] Inventor: Georg Steinbichler, Rottenmann, Austria

[73] Assignee: Engel Maschinenbau Gesselschaft mbH, Schwertberg, Austria

[21] Appl. No.: 178,298

[22] PCT Filed: Sep. 9, 1992

[86] PCT No.: PCT/AT92/00117

§ 371 Date: May 31, 1994

§ 102(e) Date: May 31, 1994

[87] PCT Pub. No.: WO93/04839

PCT Pub. Date: Mar. 18, 1993

[30] Foreign Application Priority Data

Sep. 12, 1991 [AT] Austria ................ A1823/91

[51] Int. Cl.$^6$ .............. G06F 19/00; B29C 45/76
[52] U.S. Cl. ............... 364/476.01; 364/148; 364/475.02; 264/40.1; 425/135
[58] Field of Search .................. 364/140–143, 364/473, 476, 148; 425/145, 148, 135; 264/40.1, 40.5, 40.7

[56] References Cited

U.S. PATENT DOCUMENTS

| | | | |
|---|---|---|---|
| 4,695,237 | 9/1987 | Inaba | 364/476 |
| 4,805,112 | 2/1989 | Neko | 364/476 |
| 4,992,948 | 2/1991 | Pilliand | 364/474.15 |
| 5,182,716 | 1/1993 | Stroud, III et al. | 364/476 |
| 5,195,029 | 3/1993 | Murai et al. | 364/476 |
| 5,258,918 | 11/1993 | Gioncola | 364/476 |
| 5,275,768 | 1/1994 | Inaba et al. | 364/476 |
| 5,309,369 | 5/1994 | Kamiguchi et al. | 364/476 |
| 5,350,546 | 9/1994 | Takeuchi et al. | 364/476 |

FOREIGN PATENT DOCUMENTS

| | | |
|---|---|---|
| 0333155 | 9/1989 | European Pat. Off. . |
| 0368300 | 9/1989 | European Pat. Off. . |
| 0461627 | 12/1991 | European Pat. Off. . |
| 3338359 | 9/1985 | Germany . |
| 3927995 | 9/1990 | Germany . |
| 4025221 | 2/1992 | Germany . |
| 172822 | 3/1989 | Japan . |
| 156521 | 3/1989 | Japan . |
| 1244818 | 9/1989 | Japan . |
| 2106315 | 4/1990 | Japan . |

Primary Examiner—Roy N. Envall, Jr.
Assistant Examiner—Thomas E. Brown
Attorney, Agent, or Firm—Notaro & Michalos PC

[57] ABSTRACT

A process is disclosed for controlling a production machine, in particular an injection moulded machine that produces injection moulded plastic parts. During a learning cycle, rating fields that indicate the relationship between selected quality parameters of the products and selected setting parameters of the machine are determined and stored. To allow the machine to be controlled by entering the actual target values, i.e. the quality parameters of the products, the set values or set value ranges for at least two selected quality parameters are entered into a control device. The control device then determines at least one set of selected setting parameters on the basis of the stored rating fields, all predetermined quality parameters simultaneously corresponding to the predetermined set values or lying in the predetermine set value ranges.

18 Claims, 2 Drawing Sheets

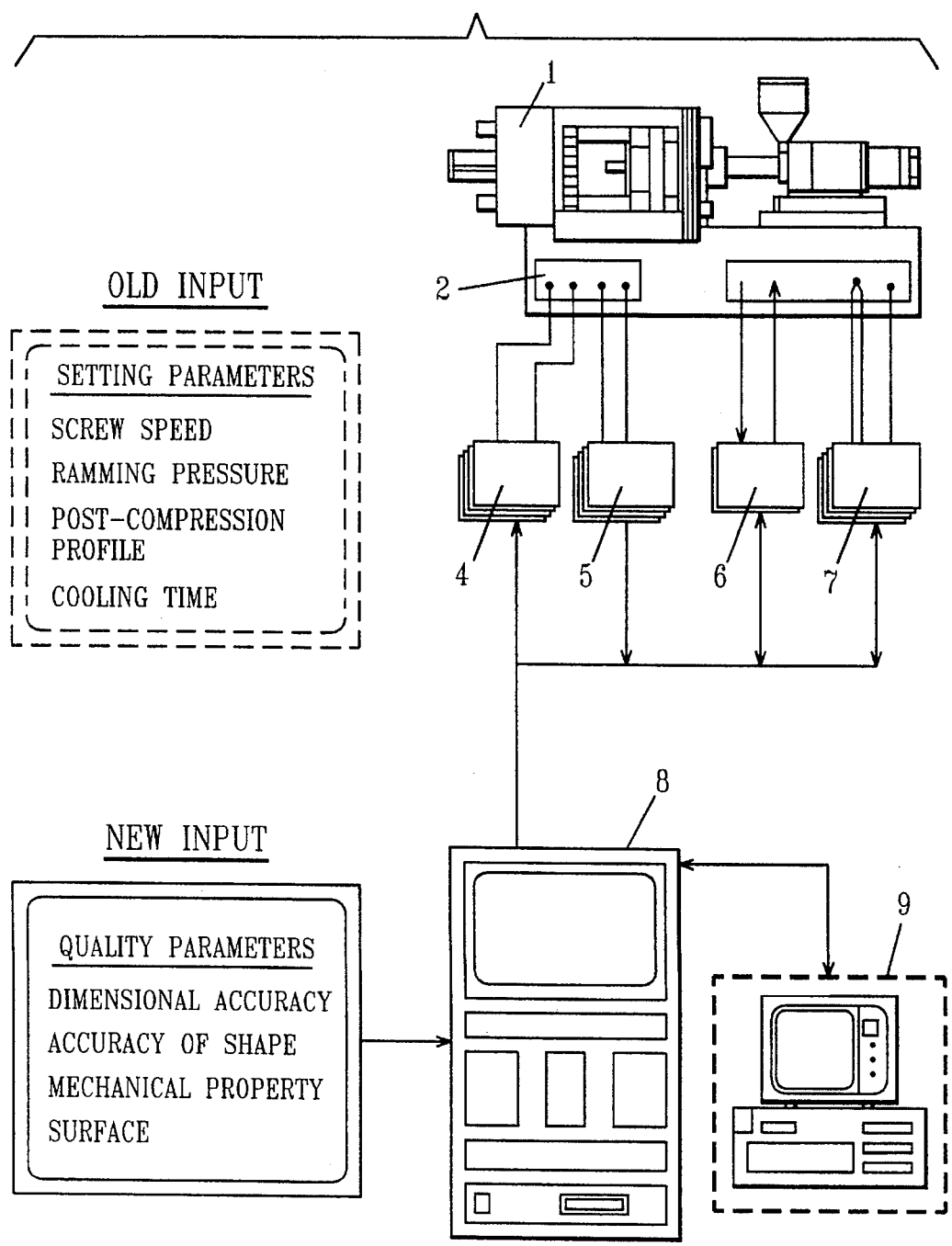

METHOD OF CONTROLLING A MACHINE FOR THE MANUFACTURE OF PRODUCTS, IN PARTICULAR FOR CONTROLLING AN INJECTION MOLDING MACHINE

The invention concerns a method of controlling a machine for the manufacture of products, in particular for controlling an injection molding machine for the manufacture of plastic injection molded parts, wherein a learning cycle involves determining and storing characteristic data arrays which indicate the dependency of selected quality parameters of the manufactured products on selected setting parameters of the machine.

Machines are set nowadays by way of machine-specific setting parameters. In the case of injection molding machines they are for example the mass cylinder temperatures, speed of rotation of the screw, ramming pressure, through-flow quantity and temperature of a coolant or temperature-control medium, injection speed profile, hydraulic pressure in the injection cylinder, post-compression time, cooling time etc. Hitherto the function of the machine setter was to arrive at a possible or the best combination of setting values for the important setting parameters, in accordance with economic and qualitative points of view. The setting values afford process parameters (for example mass temperature, molten material pressure in the tool or screw supply chamber, injection work or flow index). Besides the mold portion and tool structure and the selected material (plastic material), those process parameters in turn crucially determine the features in respect of quality of the manufactured products. Those quality features can be described by numerical values, referred to as quality parameters, for example the mass in grams. However quality parameters and therefore numerical values can also be associated with other quality features such as for example dimensional accuracy, accuracy in respect of shape, surface area and further mechanical and optical properties. The quality parameters required in relation to a manufactured product and in particular an injection molded part are usually specified for example on the drawing of the molded part and/or in a specification, in the form of desired or target values or ranges of target values, that is to say target values with tolerance limits.

If consideration is given to the number of setting parameters and the combinations of the values thereof on the machine and the measured or evaluated values in respect of the quality parameters, it quickly becomes clear that quantitative assessment of dependencies which are partially known in qualitative terms cannot be mastered without aid, even for an experienced machine setter (injection molder). The result is that existing reserves in regard to quality and output are not utilised.

Therefore the object of the invention is to provide a method of controlling a machine for the manufacture of products of the kind set forth in the opening part of this specification, which makes control of the machine for the manufacture of products, with consideration of the prescribed quality parameters, substantially easier for the machine setter.

In accordance with the invention that is achieved in that, to control the machine, the reference values or reference value ranges for at least two selected quality parameters are inputted into a control means and that at least one set of selected setting parameters in which simultaneously all predetermined quality parameters correspond to the respectively predetermined reference values or lie in the predetermined reference value ranges is ascertained by the control means by reference to the stored characteristic data arrays.

Therefore the basic idea of the invention involves inputting the actual target parameters, namely the quality parameters, and computing therefrom, from the known characteristic data arrays, possible sets or the best set of setting parameters, in which all predetermined quality parameters are simultaneously attained.

The recording of characteristic data arrays or fields in a learning cycle which contain the dependency of one or more measured quality parameters on a plurality of setting or process parameters is already known from German laid-open application (DE-OS) No 39 27 995. Unlike the method according to the invention, in that case however the characteristic data arrays are not utilised for controlling the injection molding machine by way of the quality parameters. On the contrary in that procedure only the isobaric post-compression duration and/or the isobaric post-compression is controlled in dependence on the characteristic data arrays.

With the method according to the invention it is advantageously provided that the set or sets of setting parameters, which is or are ascertained by the control means, is or are displayed or printed out, wherein preferably there is also a graphic representation of the position of the quality parameters relative to the inputted reference value range, for each set. After the machine setter has inputted into the control means selected decisive quality parameters (for example certain dimensions, optical qualities, mass, etc.), the control means computes for the machine setter the possible set of setting parameters which lead to the specified quality parameters. The machine setter can then select one of those possible sets and set it at the machine. Particularly when there is only one possible set of setting parameters, it is certainly also possible and advantageous for the set of setting parameters which is ascertained by the control means to be automatically set by the machine control system on the machine. It will be appreciated that in that case it is possible for the machine setter to be able to confirm the proposal supplied by the control means in respect of the setting parameters before they are actually set. In principle it is also possible although not necessary for the machine setter to modify somewhat the set of setting parameters proposed by the machine control system.

If the machine control system supplies a plurality of sets of possible setting parameters, for the specified quality parameters, then, besides "manual" selection by the machine setter, automatic selection by the control means of the machine itself is also possible. In principle one of the possible sets of setting parameters can be selected on the basis of the principle of chance as in fact all sets of setting parameters which are supplied by the control means lead to the desired inputted quality parameters of the manufactured products. Another preferred possibility provides that, with more than one set of setting parameters which is ascertained by the control means, one of those sets is selected by the control means and automatically set at the machine. Alternatively it can be provided that the machine control system selects that set of setting parameters in which the energy consumption of the machine is at the lowest. Certain setting parameters, for example the injection pressure, can be referred to as the measurement in respect of energy consumption. A further alternative would be for the machine control system to select that set of setting parameters which involves the highest production rate. For the purposes of assessing the production rate (cycle time) it is possible for example to refer to the setting parameters consisting of the cylinder and tool temperatures prior to the injection work.

Figure 2B:
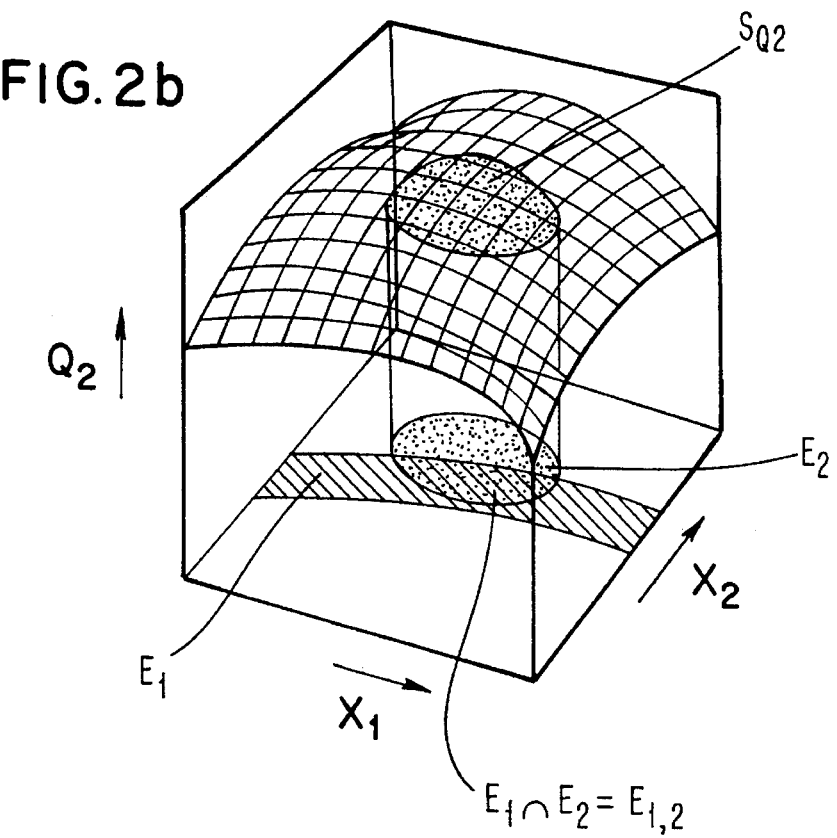

Further advantages and details of the invention are described more fully with reference to the following specific description:

FIG. 1 is a diagrammatic view of an injection molding machine with control means connected thereto for carrying out an embodiment of the method according to the invention, and FIGS. 2a and 2b each show the functional dependency of a quality parameter on two setting parameters.

For controlling the injection molding machine shown in FIG. 1 for the manufacture of plastic injection molded parts, there is provided a control means which includes a programmable microprocessor control system 8 for the injection molding machine, which can possibly communicate with a central computer. In the present embodiment the control means controls the injection molding device by way of digital output boards or cards 4 which control switching elements, valves or the like on the injection molding machine. Return signalling from the injection molding machine, for example from a limit switch, is possible by way of the digital input boards or cards 5. Analog setting parameters of the injection molding machine 1 are controlled by way of the analog board or card or regulated by a continuous reference value-actual value comparison. Separate temperature boards or cards 7 can be provided for temperature control and regulation. The setting parameters of the injection molding machine (for example mass cylinder temperatures, speed of screw rotation, ramming pressure, temperature and quantitative flow rate of a cooling or temperature-control medium, injection speed, hydraulic pressure in the injection cylinder, molten material pressure in the screw feed chamber or tool, post-compression or cooling time) can be varied and set by way of the control means. Hitherto the machine setter had to input those parameters into the control means for example by way of a keyboard or regulating elements such as sliders or rotary knobs. In that respect quantitative evaluation of combinations of values of the setting parameters at the injection molding machine is something that even the experienced machine setter cannot in practice master, in terms of the quality parameters of the manufactured parts.

The invention now provides that, in place of the old input of the setting parameters, there is now a new input of the quality parameters of the manufactured products for controlling the machine. Those quality parameters can be inputted into the control means by way of individual setting elements such as sliders or rotary knobs but also by way of the keyboard of a terminal. The basic idea of the invention lies in utilising characteristic data arrays which are ascertained and stored in a learning cycle and which indicate the dependency of the quality parameters of the manufactured products on the setting parameters of the machine in order by predetermining at least two quality parameters to ascertain one or more sets of setting parameters, in which all predetermined quality parameter values are simultaneously fulfilled.

It is firstly established which quality parameters are crucial. For that purpose, it is either possible to select them from a list or in addition specific quality parameters can be defined, which respectively numerically describe a quality feature. In principle it would now be possible to investigate in a learning cycle the influence of all setting parameters on the selected quality parameters. It is however more appropriate to initially select setting parameters which are relevant in terms of quality, and not to incorporate setting parameters which are less relevant in terms of quality, into the control according to the invention. Those less relevant setting parameters can remain in a basic setting in the learning cycle and in the subsequently following production cycle.

For an initial preselection of the setting parameters which are used for controlling the machine by way of the selected quality parameters, it is possible to use a table which is prepared for example from empirical values, having regard to the plastic material and the mold portion and tool structure and which numerically evaluates the basic influenceability of quality parameters by setting parameters of the machine, wherein preferably those setting parameters are selected in which the sum of all evaluation numbers exceeds a predetermined value. The setting parameters which are selected in that situation are proposed for a subsequent preliminary investigation. In principle it is also possible for that proposal to be subsequently modified, that is to say, setting parameters for the following preliminary investigation can be taken away therefrom or added thereto. The above-mentioned table therefore permits an initial preliminary selection in which at any event setting parameters which have practically no effect at all on the selected quality features can be removed.

For further preselection or preliminary investigation of the setting parameters used for controlling the machine by way of the selected quality parameters, it is possible to produce a series of test products, wherein a product is manufactured for each setting parameter at the maximum setting value and at the minimum setting value thereof, and the quality parameters of that product are detected, while the other setting parameters are in a basic setting. That basic setting can be for example the central position between the maximum and minimum setting values. Then, a measurement in respect of the influenceability of the quality parameter by the setting parameter is ascertained for each quality parameter and for each setting parameter, from the quality parameter data which are measured on the test products, and the ascertained measurement is entered in a table. In order to be able to carry out a uniform assessment of the influences on the quality parameters, the quality parameters must be standardised. That can be effected for example by means of the tolerance limits. In order to obtain a measurement in respect of influenceability of the i-th quality parameter by the setting parameters, the measured quality parameter value $Q_i\text{max}$ at maximum setting value of the setting parameter can be subtracted from the measured quality parameter value $Q_i\text{min}$ at the minimum setting value of the setting parameter and that difference can be divided by the difference of an upper $T_i\text{max}$ and a lower $T_i\text{min}$, wherein the upper and lower tolerance limits represent the limits of the predetermined reference value range in respect of the quality parameter. The described ratio:

$$\frac{(Q_i\text{max} - Q_i\text{min})}{(T_i\text{max} - T_i\text{min})}$$

represents a measurement in respect of the influenceability of the i-th quality parameter by the respectively varied setting parameter. If the tolerance range (reference value range) of the quality parameter lies within the measured band width, the quality parameter can be directly influenced by means of the corresponding setting parameter. In the situation where the tolerance range lies outside, either no influence can be applied by way of the setting parameter or that influence can be achieved only with a combination with another setting parameter. It is therefore meaningful to define an enlarged measurement in which the above-defined measurement is multiplied by the percentage proportion of the tolerance range which lies within the measured band width. That measurement then reads as follows:

$$\frac{(Q_i\max - Q_i\min)}{(T_i\max - T_i\min)} \times \begin{array}{l}\text{percentage proportion of the}\\ \text{tolerance for } Q_i \text{ in the}\\ \text{measured band range}\\ \text{range } (Q_i\min, Q_i\max).\end{array}$$

Those measurements can be defined for each setting parameter and for each quality parameter and listed in a table as follows:

|     | QP$_1$ | QP$_2$ | ... |
| --- | --- | --- | --- |
| TP$_1$ | 0.1 | 3.4 | |
| TP$_2$ | 2.5 | 0.3 | |
| TP$_3$ | 0.6 | 0.8 | |
| . | | | |
| . | | | |

In addition the position of the tolerance range (reference value range) and the measurement range (band width) of the individual quality parameters can be illustrated in a graph representation which is for example printed out or displayed on a picture screen. By means of the above-mentioned measurements, it is possible to provide for a proposal in respect of succession for the setting parameters. In that way a given number of setting parameters can be picked out, either in accordance with the proposal or in accordance with the operator's own choice. In order to keep the level of computing and operating expenditure in the learning cycle low, it is possible for example to select three setting parameters. In principle however more or fewer than three setting parameters are also conceivable and possible.

In order quantitatively to ascertain the dependency of the individual quality parameters $Q_j$ on the selected r-setting parameters, a polynomial expression of the following form is made:

$$Q_j = P_{1j}^{(g1)}(x_1) \cdot P_{2j}^{(g2)}(x_2) \ldots P_{rj}^{(gr)}(x_r),$$

wherein $P_{ij}^{(gi)}(x_i)$ is a polynomial of the degree $g_i$ in the setting parameter $x_i$. The constant coefficients (regression constants) which are contained in that expression after multiplying out the polynomials are ascertained by means of a regression analysis operation, for example by means of the method of least squares, from the quality parameters $Q_j$ measured in the learning cycle in dependence on the setting parameters. In that respect the number of combinations of setting parameters must correspond at least to the number of constant coefficients contained in the stated polynomial expression in order to permit clear determination of those coefficients. In general it will be sufficient to take account of linear and square influences of the setting parameters on the quality parameters, that is to say all polynomials $P_{ij}^{(gi)}(x_i)$ are of the degree $g_i=2$. Then for the above-described preferred case of three setting parameters the polynomial expression would be of the following configuration:

$$Q_j = A_{1j} + A_{2j}x_1 + A_{3j}x_2 + A_{4j}x_3 + A_{5j}x_1^2 + A_{6j}x_2^2 + A_{7j}x_3^2 + A_{8j}x_1x_2 + \ldots + A_{27j}x_1^2x_2^2x_3^2.$$

That expression for the j-th quality parameter $Q_j$ has 27 regression constants $A_{ij}$ (i=1, . . . ,27). In order to determine same, in the learning cycle at least 27 test products must be manufactured with different combinations of values of the setting parameters and measured in respect of the quality parameter $Q_j$. With the selected three setting parameters $x_1$, $x_2$ and $x_3$ that can be effected by a procedure whereby in the learning cycle three different values are respectively set in respect of each said parameter. That now gives a total of 27 combinations of values. It will be appreciated that the products manufactured with a combination of values of setting parameters in the learning cycle are also investigated in regard to a plurality of quality parameters. Accordingly in the specified example with a quadratic polynomial expression and three setting parameters with 27 combinations of values for the setting parameters in the learning cycle it is possible to determine the regression constants $A_{ij}$ of all quality parameters $Q_j$. Thereafter the functional dependency of each selected quality parameter $Q_j$ on the selected setting parameters $x_1$, $x_2$ and $x_3$ (in the general case $x_1, \ldots, x_r$), that is to say the characteristic data array or field, is known.

In principle it is sufficient in the learning cycle to produce a product for each set of setting values in respect of the setting parameters. It is more advantageous however if a plurality of and preferably at least five products are manufactured for each set of setting values in respect of the setting parameters in the learning cycle. That permits on the one hand mere accurate ascertainment of the quality parameters as a mean value over the quality parameters of the products respectively manufactured with the same setting parameters and thus a mere accurate characteristic data array which indicates the dependency of the quality parameter on the setting parameters. In addition those ascertained data can be used for a correlation and/or variance analysis operation in order to ascertain the influence of a setting parameter or a combination of setting parameters on a quality parameter. That can be used to omit from the outset in the regression expression (for example in the above polynomial expression) certain setting parameters or combinations thereof, and thus reduce the computing expenditure.

The methods of the correlation and variance analysis operation will be described in somewhat greater detail below:

Correlation analysis permits an investigation in respect of linear influences.

i . . . i-th measurement
$t_i$ . . . setting parameter of the i-th measurement
$Q_i$ . . . quality parameter of the i-th measurement
tm . . . mean value in respect of the setting parameters
Qm . . . mean value in respect of the quality parameters The correlation coefficient is of the following configuration:

$$\frac{\Sigma(t_i - tm)*(Q_i - Qm)}{\sqrt{\Sigma(t_i - tm)^2 * \Sigma(Q_i - Qm)^2}}$$

That coefficient is in the range −1 to +1. A dependency occurs if the coefficient is as large as possible in terms of magnitude.

Variance analysis permits investigation in respect of general dependencies. In simple variance analysis the influence of a setting parameter on a quality parameter can be investigated, for example:

| Mass temperature (setting parameter) | Mass (quality parameter) | Mean value mass | Variance |
| --- | --- | --- | --- |
| 200° C. | 88,75,68 . . . | m1 = 87.6 | v1 = 107.7 |
| 210° C. | 78, . . . | m2 = 75.1 | v2 = 156.2 |
| 220° C. | 71,65, . . . | m3 = 65.3 | v3 = 194.8 |
| | | m = 76.0 | |

A measurement in respect of the dependency is represented by the following expression:

$$\frac{(m1-m)^2 + (m2-m)^2 + (m3-m)^2}{v1 + v2 + v3}$$

If that measurement is smaller than a predeterminable constant, no influence can be assumed. Otherwise it can be assumed that an influence exists.

The variance analysis can be extended to two factors. In that case tests are obtained to show whether an individual factor has an influence or whether both factors jointly have an influence on the quality parameter.

By means of variance analysis it is possible for setting parameters or combinations of setting parameters to be separated out of the above-indicated regression expression so that the computing expenditure can be reduced.

Now, in the method according to the invention, the characteristic data arrays which in the learning cycle are ascertained and stored are put to use to control the machine by way of the control means by the input of at least two selected quality parameters, wherein at least one set of selected setting parameters in which simultaneously all predetermined quality parameters correspond to the respectively predetermined reference values or lie in the predetermined reference value ranges is ascertained by the control means by virtue of the stored characteristic data arrays.

FIGS. 2a and 2b show how the possible setting parameters can be successively narrowed down from the known characteristic data arrays with predetermined quality parameter reference value ranges. The computations can be performed for example in a suitably programed microprocessor or personal computer.

For the sake of simplicity of the graphic representation FIG. 2a shows the dependency of a first quality parameter $Q_1$ on only two setting parameters. It will be appreciated that in practice a plurality of setting parameters can be taken into consideration. $S_{Q1}$ shows the reference value range for the first quality parameter which is inputted into the control means. The latter then ascertains from the known stored characteristic data array those setting parameter combinations $(x_1, x_2)$, in the setting of which the quality parameter $Q_1$ lies in the reference value range $S_{Q1}$. The possible setting parameters $(x_1, x_2)$ lie in the setting field or area $E_1$.

FIG. 2 shows the characteristic data array of a second quality parameter $Q^2$ in dependence on the same setting parameters $x_1$ and $x_2$. The setting field or area $E_2$ is ascertained in the control means from the inputted reference value range $S_{Q2}$ for the quality parameter $Q_2$. If the setting parameters $(x_1, x_2)$ lie in the setting field or area $E_2$, then the quality parameter $Q_2$ lies in the reference value range $S_{Q2}$. If now the setting range $E_2$ is intersected with the setting range $E_1$ transferred from FIG. 2a, that gives a setting range $E_{1,2}$ which indicates that range for the setting parameters $(x_1, x_2)$ in which the quality parameter $Q_1$ lies in its reference value range $S_{Q1}$ and at the same time the quality parameter $Q_2$ lies in its reference value range $S_{Q2}$. A further narrowing in respect of the setting range for the quality parameters $x_1$ and $x_2$ can be effected by taking account of further quality parameters (not shown here) so that the result for example is also only one setting combination $(x_1, x_2)$, that is to say one working point is left. The machine control system can set such a working point, possibly after confirmation by the machine setter, automatically at the machine itself. If, after all selected quality parameters have been taken into account, a plurality of sets of possible setting parameters are initially still left, then a graphic representation of the position of the quality parameters, in relation to the respective inputted reference value range, can initially be effected for each set $(x_1, x_2)$. The machine setter can then select one of the offered sets of setting parameters. It is however also possible for the control means automatically to make such a selection in which for example it selects and proposes that set of setting parameters in which the deviation of the quality parameters from the middle of the reference value ranges is at its smallest. It is also possible for the machine control system to select that set of setting parameters in which the energy consumption of the machine is at its lowest or the production rate is at the highest.

In principle it is also possible that for the required quality parameters there is not a set of selected setting parameters in which all predetermined quality parameters simultaneously lie in the reference value range. In that case the machine control system can supply a corresponding display. It is also advantageously possible to provide a display as to the sets or combinations of selected setting parameters in which as many quality parameters as possible still lie in the inputted reference value ranges. A quality parameter can then possibly also be relinquished and a setting combination can be found, in which at least all other quality parameters lie in the reference value range. It is however also possible for example to provide a display that correction of a tool dimension is necessary.

The method according to the invention is suitable in particular for controlling an injection molding machine for the manufacture of plastic injection molded parts, but it is not restricted to such an injection molding machine. The method according to the invention permits precise control of a machine for the manufacture of products by way of the predetermination of the actual target values, namely the quality parameters of the manufactured products, whereby existing reserves in terms of quality and output of the machine can be utilised.

I claim:

1. A method for controlling an injection molding machine comprising the steps of:

preselecting a number of at least two quality parameters, which are essential for a product to be produced;

preselecting a number of setting parameters of the machine, said quality parameters of the product being dependent on said setting parameters of the machine;

determining and storing characteristic data arrays in a learning cycle, which characteristic data arrays reflect the dependencies between the quality parameters and the setting parameters;

inputting reference values or reference value ranges into a control unit for each preselected quality parameter;

ascertaining for each quality parameter by the control unit a set of all setting parameter combinations, for which the respective quality parameter corresponds to the corresponding input reference value or lies in the input reference value range; and determining the intersection of said sets in order to obtain those combinations of setting parameters for which simultaneously all preselected quality parameters correspond to the input reference values or lie in the input reference value range.

2. A method as set forth in claim 1 wherein, with a single set of setting parameters which is ascertained by the control means, it is automatically set by the machine control system on the machine.

3. A method as set forth in claim 1 wherein, with more than one set of setting parameters, which is ascertained by the control means, one of said sets is selected by the control means and automatically set at the machine.

4. A method as set forth in claim 3 wherein the machine control system selects that set of setting parameters in which the deviation of the quality parameters from the center of the reference value ranges is at the lowest.

5. A method as set forth in claim 3 wherein the machine control system selects that set of setting parameters in which the energy consumption of the machine is at the lowest.

6. A method as set forth in claim 3 wherein the machine control system selects that set of setting parameters in which the highest production rate occurs.

7. A method for controlling an injection molding machine comprising the steps of:

preselecting a number of at least two quality parameters, which are essential for a product to be produced;

preselecting a number of setting parameters of the machine, said quality parameters of the product being dependent on said setting parameters of the machine;

determining and storing characteristic data arrays in a learning cycle, which characteristic data arrays reflect the dependencies between said quality parameters and said setting parameters;

inputting reference values or reference value ranges into a control unit for each preselected quality parameter;

ascertaining for each quality parameter by the control unit a set of all setting parameter combinations, for which the respective quality parameter corresponds to the corresponding input reference value or lies in the input reference value range; and determining the intersection of said sets in order to obtain to obtain those combinations of setting parameters for which simultaneously all preselected quality parameters correspond to the input reference values or lie in the input reference value range;

the step of determining and storing characteristic data arrays in a learning cycle comprising the substeps of setting each preselected setting parameter to at least three different values;

producing one or more products at each value of each setting parameter; and determining and inputting the value of each quality parameter of each of the produced products.

8. A method for controlling an injection molding machine comprising the steps of:

preselecting a number of at least two quality parameters, which are essential for a product to be produced;

preselecting a number of setting parameters of the machine by making use of a table which numerically evaluates the basic influenceability of quality parameters by setting parameters, wherein those setting parameters are selected in which the sum of all evaluation numbers exceeds a predetermined value;

determining and storing characteristic data arrays in a learning cycle, which characteristic data arrays reflect the dependencies between the quality parameters and the setting parameters;

inputting reference values or reference value ranges into a control unit for each preselected quality parameter; and ascertaining by the control unit a set of setting parameters in which simultaneously all preselected quality parameters correspond to the input reference values or lie in the input reference value range.

9. A method as set forth in claim 8 comprising the step of manufacturing a series of test products for preselection of the setting parameters used for controlling the machine by way of the selected quality parameters, wherein a product is manufactured for each setting parameter at the maximum setting value and at the minimum setting value thereof, and the quality parameters of that product are detected, while the other setting parameters are in a basic setting, and ascertaining a measurement in respect of the influenceability of the quality parameter by the setting parameter for each quality parameter and for each setting parameter, from the measured quality parameter data.

10. A method as set forth in claim 9 wherein the measured quality parameter value at maximum setting value of the setting parameter is subtracted from the measured quality parameter value at minimum setting value of the setting parameter and said difference is divided by the difference of an upper and a lower tolerance limit of the quality parameter, wherein said ratio value represents a measurement in respect of the influenceability of the quality parameter by the setting parameter.

11. A method as set forth in claim 10 characterised in that said ratio value is multiplied by the percentage proportion of the quality parameter tolerance range which lies within the measured band width in order to obtain a further measurement in respect of the influenceability of the quality parameter by the setting parameter.

12. A method as set forth in claim 9 wherein at least one influnceability measurement are listed in a table arranged in accordance with quality parameters on the one hand and setting parameters on the other hand.

13. A method for controlling an injection molding machine comprising the steps of:

preselecting a number of at least two quality parameters, which are essential for a product to be produced;

preselecting a number of setting parameters of the machine, said quality parameters of the product being dependent on said setting parameters of the machine;

determining and storing characteristic data arrays in a learning cycle, which characteristic data arrays reflect the dependencies between said quality parameters and said setting parameters;

inputting reference values or reference value ranges into a control unit for each preselected quality parameter; and ascertaining by the control unit a combination of setting parameters for which simultaneously all preselected quality parameters correspond to the input reference values or lie in the input reference value range;

the step of determining and storing characteristic data arrays in a learning cycle comprising the substeps of setting each preselected setting parameter to at least two different values;

producing one or more products at each value of each setting parameter; and determining and inputting the value of each quality parameter of each of the produced products.

14. A method as set forth in claim 13 wherein a plurality of and preferably at least five products are manufactured for each set of setting values of the setting parameters in the learning cycle.

15. A method as set forth in claim 14 wherein a correlation and/or variance analysis operation is carried out on the ascertained data in order to ascertain the influence of a setting parameter or a combination of setting parameters on a quality parameter.

16. A method as set forth in claim 13 wherein for each quality parameter $Q_j$ (j=1, . . . , m), as is known per se, a polynomial expression of the following form is made:

$$Q_j = P_{1j}^{(g1)}(x_1) \cdot P_{2j}^{(g2)}(x_2) \ldots P_{rj}^{(gr)}(x_r)$$

wherein $P_{ij}^{(gi)}(x_i)$ is a polynomial of the degree $g_i$ in the setting parameter $x_i$ and wherein the constant coefficients (regression constants) which are contained in that expression after multiplying out the polynomials are ascertained by means of regression calculation, for, from the quality parameters $Q_j$ measured in the learning cycle in dependence on the setting parameters $(x_1, \ldots x_r)$.

17. A method as set forth in claim 16 wherein all polynomials $P_{ij}^{(gi)}(x_i)$ are of the degree $gi_i=2$.

18. A method as set forth in claim 16 wherein three setting parameters are selected, that is to say r=3.

* * * * *